United States Patent
Tanaka et al.

[11] Patent Number: 5,879,813
[45] Date of Patent: Mar. 9, 1999

[54] MULTI-LAYERED FILM

[75] Inventors: Kazunori Tanaka, Koriyama; Hiroshi Tokuda, Sagamihara, both of Japan

[73] Assignee: Teijin Limited, Osaka, Japan

[21] Appl. No.: 616,494

[22] Filed: Mar. 19, 1996

[30] Foreign Application Priority Data

Mar. 20, 1995 [JP] Japan ................................. 7-060777

[51] Int. Cl.$^6$ .............................. B32B 7/06; B32B 27/08; B32B 27/32; B32B 27/36
[52] U.S. Cl. ...................... 428/483; 428/480; 428/523; 428/704; 428/910; 524/154
[58] Field of Search .................. 428/40.1, 41.8, 428/41.7, 41.3, 42.2, 42.3, 480, 483, 523, 704, 910; 264/449, 464, 465, 466; 524/154, 136, 147

[56] References Cited

U.S. PATENT DOCUMENTS

| | | | |
|---|---|---|---|
| 3,223,757 | 12/1965 | Owens et al. | 264/22 |
| 3,940,547 | 2/1976 | Needham et al. | 428/463 |
| 4,594,203 | 6/1986 | Hagiwara et al. | 264/22 |
| 4,767,654 | 8/1988 | Riggsbee | 428/40 |
| 4,943,380 | 7/1990 | Sugiura et al. | 252/8.7 |
| 5,021,473 | 6/1991 | Macholdt et al. | 523/451 |
| 5,106,912 | 4/1992 | Yamamoto et al. | 525/212 |
| 5,188,774 | 2/1993 | Nitta et al. | 264/22 |
| 5,385,805 | 1/1995 | Leenders et al. | 430/257 |
| 5,409,772 | 4/1995 | Yabusa et al. | 428/335 |
| 5,449,709 | 9/1995 | Imae et al. | 524/154 |

FOREIGN PATENT DOCUMENTS

| | | |
|---|---|---|
| 0403664 | 12/1990 | European Pat. Off. |
| 37-6142 | 6/1962 | Japan . |
| 37-8977 | 7/1962 | Japan . |
| 37-8978 | 7/1962 | Japan . |
| 51-30862 | 3/1976 | Japan . |
| 52-37892 | 3/1977 | Japan . |
| 63-239810 | 10/1988 | Japan . |
| 911528 | 11/1962 | United Kingdom . |

OTHER PUBLICATIONS

Schmitz, Peter et al., "Films." Ullmann's Encyclopedia of Industrial Chemistry, 5th Ed., vol. A11, pp. 85–110, 1988.
Abstract of Jap. Laid–Open Pat. Appln. Publ. No. 1–62335 (Mar. 8, 1989).
Abstract of Jap. Laid–Open Pat. Appln. Publ. No. 52–37982 (Mar. 24, 1977).

*Primary Examiner*—Vivian Chen
*Attorney, Agent, or Firm*—Sherman and Shalloway

[57] ABSTRACT

A multi-layered film comprises a polyolefin first layer and at least one second layer composed of polyester or polyphenylene sulfide adjacent to the polyolefin layer, said polyolefin first layer containing 0.001 to 1% by weight of a quaternary phosphonium salt of sulfonic acid, and wherein the adhesion between the polyolefin first layer and the at least one second layer is 0.1 to 20 g/cm. A single-layer film composed of either the polyolefin first layer or the second layer can be readily peeled off the multi-layered film and casting of a highly uniform multi-layered film can be carried out at high speed.

15 Claims, No Drawings

MULTI-LAYERED FILM

BACKGROUND OF THE INVENTION

1. Field of the Invention

This invention relates to a multi-layered film having a polyolefin layer and at least one polyester layer adjacent to the polyolefin layer. More specifically, it relates to a multi-layered film from which a polyolefin single-layer film or a polyester single-layer film can be easily peeled and which can be cast at a high speed.

2. Description of the Prior Art

To produce a plastic film by a molten film formation technique, a molten polymer is extruded into a film and then cooled over a rotary cooling drum (cooling drum) to cast it into a solid unoriented film. This unoriented film is further drawn monoaxially or biaxially into a monoaxially oriented film or a biaxially oriented film as required. At the time when the polymer is cooled over the cooling drum, such inconvenience as the nonuniformity of the film occurs if the polymer is cooled ununiformly. To prevent this, it is necessary to adhere the molten film closely and uniformly to the cooling drum. Techniques for adhering the molten film closely to the cooling drum include one for casting a molten film under application of electrostatic charge to the molten film (JP-B-37-6142) (The term "JP-A" as used herein means an "unexamined" published Japanese patent application and the term "JP-B" as used herein means an "examined publication for patent"), one for adhering a molten film to the cooling drum with mechanical force such as a roll or belt (JP-B-37-8977), one for adhering with air force such as an air knife (JP-B-37-8978), one for casting under application of electrostatic charge to a film of a copolyester prepared by copolymerizing a component having a high dielectric constant, and the like.

When the above techniques are applied in the production of a multi-layered film having a polyolefin layer and at least one polyester film adjacent to the polyolefin layer, various problems are caused by poor adhesion between the polyolefin layer and the polyester layer, high electric resistance of polyolefin and the like.

That is, when a technique for casting while electrostatic charge is applied to a molten film is used, sufficient charge cannot be given to the molten film because polyolefin has a high electric resistance even in a molten state. As a result, adhesion between the molten film and the cooling drum lowers due to small coulomb force therebetween, whereby nonuniformity in thickness, peeling between layers and displacement between layers occur, resulting in such problems as formation of extremely unstable film. When a technique for casting while electrostatic charge is applied to a polyester prepared by copolymerizing a component having a high dielectric constant is used, similar problems arise.

When a technique for adhering with mechanical force such as a roll or belt, such problems as peeling between layers and displacement between layers occur because a force of peeling of the film from the cooling drum exceeds adhesion between the polyolefin layer and the polyester layer.

When a technique for adhering with air force such as an air knife, the molten film strongly vibrates due to an air flow, resulting in producing remarkable nonuniformity in thickness and making it difficult to obtain a desired multi-layered film.

Meanwhile, JP-A-51-30862 discloses a method for producing sheet-like plastic articles, which comprises the steps of co-extruding at least two different plastics which are not compatible with each other into sheets and separating these sheets to prepare single sheet-like plastic article.

However, this publication fails to disclose co-extrusion of polyester and polyolefin as well as cooling over a cooling drum.

JP-A-52-37982 discloses a method for orienting a thin film, which comprises the steps of orienting a laminated film which consists of a base film and a 2 to 10 $\mu$m-thick film laminated on the base film and peeling off the thin film from the base film.

However, this publication also fails to disclose a laminated film comprising a polyester and a polyolefin and cooling of an unoriented laminated film over a cooling drum.

JP-A-63-239810 discloses a method for producing a capacitor element, which comprises the steps of vapor depositing a metal on the surface of a polyphenylene sulfide film of a laminated film which consists of a polyolefin or polyester substrate film and a 0.2 to 1.5 $\mu$m-thick polyphenylene sulfide film formed on one or both surfaces of the substrate film, and rolling or laminating the metal-vapor deposited film while the metal-vapor deposited polyphenylene sulfide film was peeled off from the laminated film to form a capacitor element consisting of the polyphenylene sulfide film as a dielectric and the metal vapor deposition layers as electrodes, the thickness of the substrate film being in the range of 5 to 100 times the thickness of the polyphenylene sulfide film.

However, this publication fails to disclose a polyolefin containing a quaternary phosphonium salt of sulfonic acid and cooling of the laminated film over a cooling drum.

SUMMARY OF THE INVENTION

An object of the present invention is to provide a novel multi-layered film.

Another object of the present invention is to provide a multi-layered film which is capable of electrostatic casting over a cooling drum smoothly and at a high speed in spite of a laminated film having a polyolefin layer as a layer adjacent to a polyester or polyphenylene sulfide layer.

A further object of the present invention is to provide a multi-layered film in which the above two adjacent layers can be easily separated from each other and thereby thin films, each made of a single substrate and having a uniform thickness, can be given.

Other objects and advantages of the present invention will be apparent from the following description.

DESCRIPTION OF THE PREFERRED EMBODIMENTS

According to the present invention, firstly, the above objects and advantages of the present invention can be accomplished by a multi-layered film which comprises (A) at least one first polymer layer of a polyolefin containing 0.001 to 1% by weight, based on the polyolefin, of a quaternary phosphonium salt of sulfonic acid and (B) at least one second polymer layer of a polymer selected from the group consisting of polyesters and polyphenylene sulfides, at least one first polymer layer and at least one second polymer layer being adjacent to each other and adhesion between these adjacent layers being in the range of 0.1 to 20 g/cm.

The multi-layered film of the present invention, as described above, comprises at least one first polymer layer of a polyolefin and at least one second polymer layer of a polymer selected from the group consisting of polyesters and polyphenylene sulfides.

The polyolefin constituting the first polymer layer may be a homopolymer or a copolymer which may be a random copolymer or a block copolymer. The polyolefin constituting the single first polymer layer may be a single polymer or a blend of two or more polyolefins.

An olefin forming the polyolefin is preferably an α-olefin having 2 to 10 carbon atoms. Illustrative examples of the α-olefin having 2 to 10 carbon atoms include ethylene, 1-propene, 1-butene, 1-pentene, 4-methyl-1-pentene, 1-hexene, 1-octene, 1-nonene, 1-decene and the like.

Specific examples of the polyolefin include low-density polyethylene, high-density polyethylene, polypropylene, poly (ethylene/propylene) copolymer, polybutylene and copolymers thereof. Among these polyolefins, polypropylene having a melting point of 100 to 170° C. and copolypropylene are preferred in view of their excellent co-extrudability and co-orientability with polyesters. Copolypropylene (for example, poly(propylene/ethylene) copolymer) containing 10 mol % or less of a copolymer component is particularly preferred.

In the present invention, it is significant that the polyolefin contains 0.001 to 1% by weight, based on the polyolefin, of a quaternary phosphonium salt of sulfonic acid.

If this proportion is less than 0.001% by weight, adhesion between the multi-layered film and the cooling drum is insufficient. If the proportion is more than 1% by weight, dispersibility of the quaternary phosphonium salt of sulfonic acid in the polyolefin deteriorates, whereby fish eyes are generated in the film, or thermal deterioration in the quaternary phosphonium salt of sulfonic acid and the polyolefin becomes noticeable during the formation of a molten film, resulting in marked coloring of the film.

The content of the quaternary phosphonium salt of sulfonic acid is preferably 0.003 to 0.5% by weight, more preferably 0.005 to 0.1% by weight.

The quaternary phosphonium salt of sulfonic acid is preferably a compound represented by the following formula (I):

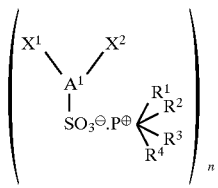

wherein $X^1$ and $X^2$ are the same or different and each is hydrogen atom or an ester-forming functional group; $R^1, R^2, R^3$ and $R^4$ are the same or different and each is an alkyl group having 1 to 18 carbon atoms, a benzyl group or an aryl group having 6 to 12 carbon atoms; n is 1 or 2; and $A^1$ is an aliphatic hydrocarbon group or an aromatic hydrocarbon group having 2 to 18 carbon atoms and a valence of (n+2), provided that both the $X^1$ and $X^2$ should not be hydrogen atom at the same time, or a compound represented by the following formula (II):

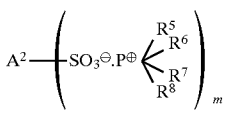

wherein $R^5, R^6, R^7$ and $R^8$ are the same or different and each is an alkyl group having 1 to 18 carbon atoms, a benzyl group or an aryl group having 6 to 12 carbon atoms; m is 1 or 2; and $A^2$ is an aliphatic hydrocarbon group or an aromatic hydrocarbon group having 4 to 18 carbon atoms and a valence of m.

In the above formula (I), $X^1$ and $X^2$ are the same or different and selected from hydrogen atom and an ester forming functional group. Illustrative examples of the ester forming functional group include a carboxyl group, an alkoxycarbonyl group, a hydroxyl group and the like. However, both the $X^1$ and $X^2$ cannot be hydrogen atom at the same time.

$R^1, R^2, R^3$ and $R^4$ are the same or different and selected from the group consisting of an alkyl group having 1 to 18 carbon atoms, a benzyl group and an aryl group having 6 to 12 carbon atoms. The alkyl group having 1 to 18 carbon atoms may be straight-chain or branched-chain, with illustrative examples thereof including methyl, ethyl, n-propyl, iso-propyl, n-butyl, iso-butyl, sec-butyl, tert-butyl, n-pentyl, n-hexyl, n-octyl, n-nonyl, n-decyl, n-undecyl, n-dodecyl, n-pentadecyl, n-octadecyl and the like. Illustrative examples of the aryl group having 6 to 12 carbon atoms include phenyl, tolyl, xylyl, cumyl, naphthyl, biphenyl and the like.

n is 1 or 2. $A^1$ is an aliphatic hydrocarbon group or an aromatic hydrocarbon group having 2 to 18 carbon atoms and a valence of (n+2), that is, 3 or 4. Illustrative examples of $A^1$ are obvious from the following examples of the compound of the formula (I).

Illustrative examples of the phosphonium cation in the formula (I) include aliphatic phosphoniums such as tetramethyl phosphonium, tetraethyl phosphonium, tetrabutyl phosphonium, triethylmethyl phosphonium, tributylmethyl phosphonium, tributylethyl phosphonium, trioctylmethyl phosphonium, trimethylbutyl phosphonium, trimethyloctyl phosphonium, trimethyllauryl phosphonium, trimethylstearyl phosphonium, triethyloctyl phosphonium and tributyloctyl phosphonium; aromatic phosphoniums such as triphenylmethyl phosphonium, triphenylethyl phosphonium, triethylbenzyl phosphonium and tributylbenzyl phosphonium; and the like. Further, phosphoniums having a substituent such as tetramethylol phosphonium, tri(2-cyanoethyl)methyl phosphonium, tri(2-cyanoethyl)ethyl phosphonium, tri(2-cyanoethyl)benzyl phosphonium, tri(3-hydroxypropyl)methyl phosphonium, tri(3-hydroxypropyl)benzyl phosphonium, trimethyl(2-hydroxyethyl) phosphonium, tributyl(2-hydroxyethyl)phosphonium and the like may be used.

Illustrative examples of the quaternary phosphonium salt of sulfonic acid represented by the formula (I) include tetrabutyl phosphonium 3,5-dicarboxybenzene sulfonate, ethyltributyl phosphonium 3,5-dicarboxybenzene sulfonate, benzyltributyl phosphonium 3,5-dicarboxybenzene sulfonate, phenyltributyl phosphonium 3,5-dicarboxybenzene sulfonate, tetraphenyl phosphonium 3,5-dicarboxybenzene sulfonate, ethyltriphenyl phosphonium 3,5-dicarboxybenzene sulfonate, butyltriphenyl phosphonium 3,5-dicarboxybenzene sulfonate, benzyltriphenyl phosphonium 3,5-dicarboxybenzene sulfonate, tetrabutyl phosphonium 3,5-dicarbomethoxybenzene sulfonate, ethyltributyl phosphonium 3,5-dicarbomethoxybenzene sulfonate, benzyltributyl phosphonium 3,5-dicarbomethoxybenzene sulfonate, phenyltributyl phosphonium 3,5-dicarbomethoxybenzene sulfonate, tetraphenyl phosphonium 3,5-dicarbomethoxybenzene sulfonate, ethyltriphenyl phosphonium 3,5-dicarbomethoxybenzene sulfonate, butyltriphenyl phosphonium 3,5-dicarbomethoxybenzene sulfonate, benzyltriphenyl phosphonium 3,5-dicarbomethoxybenzene sulfonate, tetrabutyl phosphonium 3-carboxybenzene sulfonate, tetraphenyl phosphonium 3-carboxybenzene sulfonate, tetrabutyl phosphonium 3-carbomethoxybenzene sulfonate, tetraphenyl phosphonium 3-carbomethoxybenzene sulfonate, tetrabutyl phosphonium 3,5-di(β-hydroxyethoxycarbonyl)benzene sulfonate, tetraphenyl phosphonium 3,5-di(β-hydroxyethoxycarbonyl)benzene sulfonate, tetrabutyl phosphonium 3-(β-hydroxyethoxycarbonyl)benzene sulfonate, tetraphenyl phosphonium 3-(β-hydroxyethoxycarbonyl) benzene sulfonate, tetrabutyl phosphonium 4-hydroxyethoxybenzene sulfonate, bisphenol-A-3,3'-di (tetrabutyl sulfonic acid phosphonium salt), tetrabutyl phosphonium 2,6-dicarboxynaphthalene-4-sulfonate, α-tetrabutyl phosphonium sulfosuccinic acid and the like.

$R^5$, $R^6$, $R^7$ and $R^8$ in the above formula (II) are the same or different and selected from the group consisting of an alkyl group having 1 to 18 carbon atoms, a benzyl group and an aryl group having 6 to 12 carbon atoms. Illustrative examples of the alkyl group having 1 to 18 carbon atoms and the aryl group having 6 to 12 carbon atoms are the same as those provided for the formula (I).

M is 1 or 2.

$A^2$ is an aliphatic hydrocarbon group or an aromatic hydrocarbon group having 4 to 18 carbon atoms and a valence of m, that is, 1 or 2. Illustrative examples of $A^2$ are obvious from the following examples of the compound represented by the formula (II).

Illustrative examples of the phosphonium cation in the formula (II) are the same as those provided for the formula (I).

Illustrative examples of the compound wherein m is 1 among the quaternary phosphonium salts of sulfonic acid represented by the formula (II) include aliphatic sulfonates and mixtures thereof such as butyl sulfonate, octyl sulfonate, lauryl sulfonate, myristyl sulfonate, hexadecyl sulfonate and 2-ethylhexyl sulfonate; substituted phenyl sulfonates such as p-tosylate, butylphenyl sulfonate, dodecylphenyl sulfonate, octadecylphenyl sulfonate and dibutylphenyl sulfonate; substituted or non-substituted naphthyl sulfonates such as naphthyl sulfonate, diisopropylnaphthyl sulfonate and dibutylnaphthyl sulfonate; and the like. Illustrative examples of the compound wherein m is 2 include 1,1-ethanedisulfonic acid, 1,2-ethanedisulfonic acid, phenol-2,4-disulfonic acid, phenol-2,5-disulfonic acid, 1,2-dioxybenzene-3,5-disulfonic acid, hydroxy-2,5-disulfonic acid, 1,4-benzenedisulfonic acid, 2,5-dimethyl-1,3-benzenedisulfonic acid, 4-methyl-1,3-benzenedisulfonic acid, 5-methyl-1,3-benzenedisulfonic acid, 5-methyloxycarbonyl-1,3-benzenedisulfonic acid, 1,8-dihydroxyanthraquinone-2,7-disulfonic acid, 1,5-dihydroxyanthraquinone-2,6-disulfonic acid, 1,5-dimethoxyanthraquinone-2,6-disulfonic acid and the like.

Among these quaternary phosphonium salts of sulfonic acid, quaternary phosphonium salts of sulfonic acid represented by the above formula (I) are preferred because they improve adhesion between a multi-layered film and a cooling drum. Particularly, 3,5-dicarboxybenzene tetra-n-butyl phosphonium sulfonate is preferred. Quaternary phosphonium salts of sulfonic acid may be used alone or in combination of two or more.

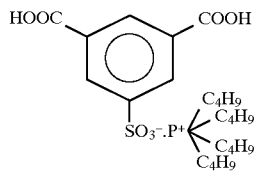

(III)

The specific volume resistance of the substrate of the first polymer layer in a molten state is preferably $0.5 \times 10^9$ Ω.cm or less at a temperature 15° C. higher than the melting point of the polymer constituting the second polymer layer. When the specific volume resistance is within this range, electrostatic charge application to the multi-layered film in casting is strong, resulting in good adhesion between the cooling drum and the multi-layered film.

The second polymer layer is made of a polyester or a polyphenylene sulfide.

The polyester is preferably an aromatic polyester comprising an aromatic dicarboxylic acid component and an aliphatic diol component having 2 to 10 carbon atoms.

Preferred examples of the dicarboxylic acid component include terephthalic acid, 2,6-naphthalenedicarboxylic acid, isophthalic acid, 4,4'-diphenyldicarboxylic acid and the like, among which terephthalic acid, isophthalic acid and 2,6-naphthalenedicarboxylic acid are particularly preferred.

Illustrative examples of the diol component include ethylene glycol, propylene glycol, 1,4-butane diol, 1,5-pentane diol, 1,6-hexane diol, 1,8-octamethylene glycol, 1,10-decamethylene glycol, 1,4-cyclohexane dimethanol, diethylene glycol, neopentyl glycol and the like, among which ethylene glycol and 1,4-butane diol are particularly preferred.

Preferred examples of the polyester include polyethylene terephthalate, polyethylene-2,6-naphthalene dicarboxylate and polybutylene terephthalate because a film of only a polyester formed of the above compounds when it was peeled off from a multi-layered film, has excellent mechanical and thermal properties.

The above preferred examples of the polyester such as polyethylene terephthalate, polyethylene-2,6-naphthalene dicarboxylate and polybutylene terephthalate also include copolyesters having other copolymer component substituted for part, for example, 10 mol % or less, of a dicarboxylic acid component or a diol component, and copolyesters prepared by copolymerizing a polyvalent compound having a functionality of 3 or more in such a small amount (for example, 5 mol % or less) that the polyesters become substantially linear.

Preferred examples of the other copolymer component in the case of polyethylene terephthalate include isophthalic acid, 2,6-naphthalenedicarboxylic acid, 4,4'-diphenyldicarboxylic acid and the like as the acid component and propylene glycol, 1,4-butane diol, 1,5-pentane diol, 1,6-hexane diol, 1,4-cyclohexane dimethanol, diethylene glycol, neopentyl glycol and the like as the diol component.

Preferred components to be copolymerized with polyethylene-2,6-naphthalene dicarboxylate include terephthalic acid, isophthalic acid, 4,4'-diphenyldicarboxylic acid and the like as the acid component and propylene glycol, 1,4-butane diol, 1,5-pentane diol, 1,6-hexane diol, 1,4-cyclohexane dimethanol, diethylene glycol, neopentyl glycol and the like as the diol component.

Preferred components to be copolymerized with polybutylene terephthalate include isophthalic acid, 2,6-naphthalenedicarboxylic acid, 4,4'-diphenyldicarboxylic acid and the like as the acid component and ethylene glycol, 1,6-hexane diol, propylene glycol, 1,5-pentane diol, 1,4-cyclohexane dimethanol, diethylene glycol, neopentyl glycol and the like as the diol component.

In addition to the above components to be copolymerized with polyethylene terephthalate, polyethylene-2,6-naphthalene dicarboxylate and polybutylene terephthalate, there are also given dicarboxylic acid components such as hexahydroterephthalic acid, adipic acid, sebacic acid, dodecanedicarboxylic acid and the like and diol components such as 1,3-propane diol, polyethylene glycol, polytetramethylene glycol, dipropylene glycol, triethylene glycol, bisphenol A and the like.

The above polyesters may be homopolymers or copolymers, or blends thereof.

The polyphenylene sulfide is preferably a poly(p-phenylene sulfide). Specific examples of the poly(p-phenylene sulfide) include homopolymers and copolymers in which recurring units represented by the following formula:

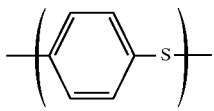

account for at least 70 mol %, preferably at least 85 mol %, of the whole recurring units. 30 mol % or less, preferably 15 mol % or less, of the whole recurring units can be made up by recurring units having a copolymerizable sulfide bond.

When the proportion of the copolymer component is too large, the crystallinity and thermal transition temperature of the polymer lower, resulting in deterioration in the heat resistance, dimensional stability or mechanical properties of the resulting film.

Illustrative examples of the recurring unit having a copolymerizable sulfide bond include recurring units represented by the following formulas:

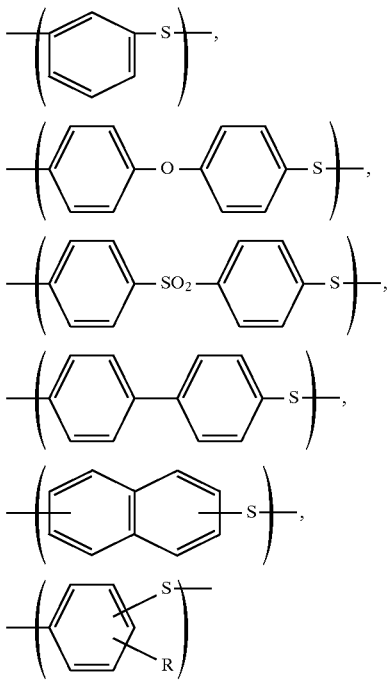

(R is an alkyl group, an alkoxyl group, a phenyl group or a nitro group) and

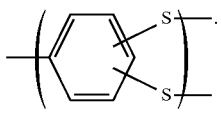

The specific volume resistance of the substrate of the second polymer layer in a molten state is preferably $0.5 \times 10^9$ $\Omega$.cm or less at a temperature 15° C. higher than the melting point of the polymer (that is, a polyester or a poly(p-phenylene sulfide)) constituting the second polymer layer. When the specific volume resistance is within this range, electrostatic charge application to a multi-layered film in casting is strong, resulting in good adhesion between the cooling drum and the multi-layered film.

The polymer having such specific volume resistance within the above range can be obtained by blending or copolymerizing the polymer with an alkali metal salt compound, for example. In the case of a polyester, the polymer having the specific volume resistance within the above range can be easily obtained by blending or copolymerizing the polyester with a quaternary phosphonium salt of sulfonic acid. The compound represented by the above formula (I) or (II) is preferably used as the a quaternary phosphonium salt of sulfonic acid.

The multi-layered film of the present invention comprises at least one first polymer layer and at least one second polymer layer which are adjacent to each other. Adhesion between the first polymer layer and the second polymer layer which are adjacent to each other is in the range of 0.1 to 20 g/cm, preferably 0.1 to 10 g/cm. If the adhesion is less than 0.1 g/cm, peeling between layers and displacement between layers occur when a roll of the multi-layered film is stored or transported, causing such troubles as wrinkles and ruptures. If the adhesion is more than 20 g/cm, disadvantageously, the film is broken or a pinhole is produced when the first polymer layer or the second polymer layer is peeled off from the multi-layered film.

When the first polymer and the second polymer the difference of solubility parameter (SP value) between which is 1 or more, particularly 2 or more, are used in combination, the first polymer layer or the second polymer layer can be easily peeled off from the multi-layered film and a single-layer film having little nonuniformity can be obtained advantageously.

To set adhesion between the first polymer layer and the second polymer layer within the above range, at least one of the adjacent first polymer layer and second polymer layer may be blended with a lubricant.

The lubricant may be liquid or solid at normal temperature, and preferably has a melting point or softening point of 200° C. or less. Illustrative examples of the lubricant are given below and may be used in combination of two or more.

Aliphatic hydrocarbons: fluid paraffin, microcrystalline wax, natural paraffin, synthetic paraffin, polyethylene wax, polypropylene wax and the like Higher fatty acids or metal salts thereof: stearic acid, calcium stearate, hydroxy stearic acid, hardened oil, sodium montanate an the like.

Fatty amides: stearic acid amide, oleic acid amide, erucic acid amide, ricinoleic acid amide, behene amide, methylene bisstearamide and the like Fatty esters: n-butyl stearate, methylhydroxy stearate, myristyl cerotinate, higher alcohol fatty esters, ester-based wax and the like Fatty acid ketones: ketone wax and the like Fatty alcohols: lauryl alcohol, stearyl alcohol, myristyl alcohol, cetyl alcohol and the like Partial esters of fatty acid and polyhydric alcohol: glycerin fatty esters, hydroxytriglyceride stearate, sorbitan fatty esters and the like Nonionic surfactants: polyoxyethylene alkyl ethers, polyoxyethylene phenyl ethers, polyoxyethylene alkyl amides, polyoxyethylene fatty esters and the like Silicone oil: straight-chain methyl silicone oil, methylphenyl silicone oil, denatured silicone oil and the like Fluorine-based surfactants: fluoroalkylcarboxylic acid, perfluoroalkylcarboxylic acid, monoperfluoroalkylethyl phosphate, perfluoroalkyl sulfonate and the like.

The lubricant may be blended in an amount of 0.001 to 1% by weight, preferably 0.005 to 0.5% by weight, based on the first polymer or the second polymer.

At least one of the first polymer and the second polymer may contain lubricating particles to improve its rolling property when the adjacent two layers are separated and rolled.

Preferred examples of the lubricating particles include inorganic fine particles such as silica prepared by a dry method, silica prepard by a wet method, zeolite, calcium carbonate, calcium phosphate, kaolin, kaolinite, clay, talc, titanium oxide, alumina, zirconia, aluminum hydroxide, calcium oxide, graphite, carbon black, zinc oxide, silicon carbide and tin oxide; and organic fine particles such as crosslinked acrylic resin particle, crosslinked polystyrene resin particle, melamine resin particle and crosslinked silicone resin particle.

The lubricating particles are preferably fine particles having an average particle diameter of 0.001 to 5.0 $\mu$m. They may be contained in a proportion of 0.01 to 0.5% by weight, for example.

In addition to the above lubricant and lubricating particles, an antioxidant, antistatic agent, coloring agent, pigment, fluorescent brightener, plasticizer, crosslinking agent, ultraviolet absorber and other resin may be added as required.

The multi-layered film of the present invention comprises at least one first polymer layer and at least one second polymer layer.

A multi-layered film comprising one layer of the first polymer and one layer of the second polymer is the simplest multi-layered film.

In a three-layered film comprising one layer of the first polymer and two layers of the second polymer, the first polymer layer may be formed as an intermediate layer and the two second polymer layers as outermost layers, or one of the two second polymer layers may be formed as an intermediate layer and the first polymer layer and the other second polymer layer as outermost layers.

Two different embodiments of a three-layered film which comprises two layers of the first polymer and one layer of the second polymer can also be easily understood from the two examples of the above three-layered film.

As is understood from the above embodiments, the multi-layered films of the present invention include a multi-layered film which comprises one layer of the first polymer and at least one layer of the second polymer which are adjacent to each other in the order named, and a multi-layered film which comprises three layers, that is, at least one layer of the first polymer and at least two layers of the second polymer which are the outermost layers and each adjacent to the first polymer layer.

As structures opposite to the above, the multi-layered films of the present invention include a multi-layered film which consists of one layer of the second polymer and at least one layer of the first polymer which are adjacent to each other in the order named, and a multi-layered film which consists of at least three layers, that is, at least one layer of the second polymer and at least two layers of the first polymer which are the outermost layers and each adjacent to the second polymer layer.

In the above embodiments, the polymer layers forming the outermost layers may be a plurality of layers of the first polymer or a plurality of layers of the second polymer.

The multi-layered film of the present invention may be an unoriented film, monoaxially oriented film or biaxially oriented film, and particularly preferable is a biaxially oriented film because it is excellent in mechanical properties. Although the thickness of a multi-layered film is not particularly limited, a biaxially oriented film, for example, has a total thickness of 5 to 100 $\mu$m, particularly preferably 5 to 50 $\mu$m, a second polymer layer thickness of 0.01 to 50 $\mu$m, particularly preferably 0.1 to 20 $\mu$m, and a first polymer layer thickness of 0.5 to 50 $\mu$m, particularly preferably 1 to 30 $\mu$m. The proportion of the total thickness of the second polymer layers to the total thickness of a multi-layered film is 2 to 50%, particularly preferably 5 to 20%.

The unoriented multi-layered film of the present invention is produced by co-extruding a multi-layered molten film comprising a first polymer layer and at least one second polymer layer adjacent to the first polymer layer over a rotary cooling drum, adhering the film to the rotating cooling drum and cooling the film. Since the polyolefin constituting the first polymer layer contains a quaternary phosphonium salt of sulfonic acid in an amount of 0.001 to 1% by weight, an electric charge can be easily applied to the molten surface of the film without contact in the vicinity of a location where the multi-layered molten film reaches the rotary cooling drum, whereby the film can be adhered closely to the rotating cooling drum.

Alternatively, an unoriented multi-layered film can be produced in the following manner. That is, the second polymer and the first polymer are supplied to separate extruders and molten at a temperature from a temperature higher than the melting points of each of the polymers to 350° C., the molten polymers are joined together into a laminate in a conduit or a molding dies, and the resulting laminate is discharged from the dies, and cooled to solidify over a cooling drum while electrostatic charge is applied to the discharged film. This unoriented multi-layered film may comprise any number of layers, provided that it comprises at least two layers, that is, one layer of the first polymer and at least one layer of the second polymer adjacent to the first polymer layer.

In the production of a multi-layered film, a polyolefin containing 0.001 to 1% by weight, preferably 0.003 to 0.5% by weight, more preferably 0.005 to 0.1% by weight, of a quaternary phosphonium salt of sulfonic acid (for example, 3,5-dicarboxybenzene tetra-n-butyl phosphonium of sulfonic acid) is used. Since the electric resistance of the polyolefin in a molten state lowers, electrostatic charge application to each of the layers constituting the multi-layered film becomes sufficient, resulting in good adhesion between the multi-layered film and the cooling drum. The resulting multi-layered film is free from defects such as pinholes, and can have good hue. Further, when a quaternary phosphonium salt of sulfonic acid is also contained in the second polymer, adhesion between the multi-layered film and the cooling drum is further improved advantageously.

It is preferable that a polyester material is dried before it is supplied to an extruder. On the other hand, although a polyolefin material does not always need to be dried, a polyolefin which is dried at a temperature of 100° C. or more and less than the melting point Tm of the polyolefin may also be used.

The above unoriented multi-layered film may further be drawn monoaxially or biaxially into a monoaxially oriented multi-layered film or a biaxially oriented multi-layered film as required. To obtain such a monoaxially oriented multi-layered film or a biaxially oriented multi-layered film, the above unoriented multi-layered film is heated at a stretchable temperature (for example, higher than Tg (glass transition temperature) of the second polymer, less than Tg+80° C.) and drawn at least monoaxially. The draw ratio is preferably 2 to 12 times in a monoaxial direction for a monoaxial oriented multi-layered film and the area draw ratio is 5 to 50 times for a biaxially oriented multi-layered film.

The above biaxially oriented multi-layered film can be produced by so-called longitudianl-transverse sequential orientation in which an unoriented multi-layered film is drawn in a longitudinal direction and then in a transverse direction, or by simultaneous biaxial orientation in which a film is drawn in both longitudinal and transverse directions at the same time. This biaxially oriented multi-layered film can be further drawn monoaxially, that is, in a longitudinal or transverse direction, or biaxially, that is, in both longitudinal and transverse directions, to produce a biaxially reoriented multi-layered film.

The above monoaxially oriented multi-layered film or biaxially oriented multi-layered film is further heated at a temperature less than Tm (melting point) of the second polymer and cooled to room temperature to prepare a monoaxially oriented (heat-treated) multi-layered film or a biaxially oriented (heat-treated) multi-layered film.

The surface of the thus obtained monoaxially oriented multi-layered film or biaxially oriented multi-layered film may be subjected to a surface activation treatment (such as plasma treatment, amine treatment, corona treatment and the like) as known by JP-A-56-18381 and JP-A-57-30854, for example.

A film of the second polymer layer only or a film of the first polymer layer only which is obtained by peeling and separating the second polymer layer or the first polymer layer from the multi-layered film of the present invention can be used for various applications.

For instance, a polyester single-layer film having a thickness of 3 μm or less, particularly an extremely thin single-layer film having a thickness of 1 μm or less, cannot be easily produced because a rupture in the orientation step and a defective winding in the winding step are liable to occur. However, such an extremely thin film can be easily obtained by peeling and separating from the multi-layered film of the present invention.

The extremely thin polyester single-layer film is useful as a capacitor film (for example, a film having a thickness of 3 μm or less), a printer ribbon film (for example, a film having a thickness of 5 μm), a thermo-sensitive stencil printing film, a magnetic recording film (for example, a QIC tape for computer recording (¼-inch cassette tape for computer recording)) and the like. When the multi-layered film of the present invention is used for application in a laminated capacitor, an extremely thin film can be obtained efficiently by vapor depositing a metal on the surface of a multi-layered film, slitting the multi-layered film, and peeling and separating the surface layer having the metal-deposited film formed thereon.

An extremely thin poly.p-phenylene sulfide (to be abbreviated as PPS hereinafter) single-layer film is useful as a capacitor film (for example, a film having a thickness of 3 μm or less) and the like.

A polyolefin single-layer film is useful for a capacitor film (for example, a film having a thickness of 3 μm or less), a non-glare film (for example, a film having a thickness of 50 μm or less) and the like.

Further, a super clean first polymer single-layer film having almost no oxide film formed and few foreign matters adhered on the surface thereof can be obtained by constructing a sandwich-structured multi-layered film consisting of a second polymer layer, a first polymer layer and a second polymer layer, and peeling and separating both the outer second polymer layers from the intermediate first polymer layer just before use.

Or a super clean second polymer single-layer film having almost no oxide film formed and few foreign matters adhered on the surface thereof can also be obtained by constructing a sandwich structured multi-layered film consisting of a second polymer layer, a first polymer layer, a second polymer layer, a first polymer layer and a second polymer layer, and peeling and separating the intermediate second polymer layer.

The single-layer film obtained from the intermediate layer of the multi-layered film is useful as a highly transparent film (highly transparent film containing no lubricating particles), an internal light diffusion film (non-glare film), a super clean film (protective film for use in medical instruments and precision instruments) and the like.

Two or more biaxially oriented single-layer films can be obtained simultaneously with high efficiency and at a low cost by peeling and separating each layer from the biaxially oriented multi-layered film of the present invention.

The above peeling and separation are preferably carried out in the final step as much as possible because it is effective in handling a film and preventing the production of wrinkles and scratches in the film. For instance, when a peeled and separated film is used just before the production of a capacitor element, the number of insulation defects greatly decreases with the result of a reduction in the proportion defective of capacitors.

The multi-layered films of the present invention can also be used as various release films.

The following examples are given to further illustrate the present invention. The physical properties were measured in accordance with the following methods.

1. Thickness of single-layer film

The thickness of an extremely shin film having a thickness of less than 1 μm was calculated from the following expression (1) based on the interval between adjacent interference fringes, using a transmission light interference thickness-measuring instrument employing a visible light wavelength emission lamp which is a halogen lamp or xenon lamp as a light source.

$$d=(\lambda 1\times\lambda 2)/[2\times n\times(\lambda 1-\lambda 2)] \quad (1)$$

wherein d is a thickness (nm), each of λ1 and λ2 is a peak wavelength of the interference fringe (nm), provided that λ1>λ2, and n is an average refractive index in longitudinal and transverse directions of the second polymer film or the first polymer film.

The thickness of a thick film to which the above method cannot be applied was measured using an electron micrometer.

2. Specific volume resistance (impedance) of molten resin

Electrodes were inserted into a molten resin heated at a temperature higher than the melting point thereof (270° C.), an AC voltage of 50 Hz was applied to the resin, and the specific volume resistance of the molten resin was measured from a current value running between the electrodes.

3. Adhesion

A multi-layered film was cut into a 10 mm wide, 100 mm long piece to measure tension (g) applied when the second polymer layer was peeled from the first polymer layer continuously at a peeling angle of 1800 and at a speed of 2 m/minute. Tension per 1 cm in width obtained from a sample width (10 mm) and an average value of this tension (g) was taken as adhesion (T(g/cm)).

4. Melting point

A temperature equivalent to the top of a heat absorption peak attendant upon melting produced at the time when the temperature of a sample (10 mg) was elevated at a rate of 20° C./minute, using DSC (Model V4.0B2000 manufactured by Du Pont), was taken as melting point (Tm).

5. Glass transition temperature

Using DSC (Model V4.0B2000 manufactured by Du Pont), the temperature of a sample was elevated at a rate of 20° C./minute to measure its glass transition point (Tg).

6. Dielectric dissipation factor (tanδ)

This was measured in accordance with JIS C 5102.

7. Intrinsic viscosity of polyester

This was measured at 35° C. in an orthochlorophenol solution.

EXAMPLE 1

Polyethylene terephthalate (Tm: 256° C., Tg: 68° C.) pellets having an intrinsic viscosity of 0.60 and containing 12 mmol % of potassium acetate based on dicarboxylic acid components and 0.3% by weight of $SiO_2$ particles having an average particle diameter of 0.12 μm based on a polyester was used as a polyester material. The pellets were dried at 170° C. for 3 hours, supplied to an extruder and melt extruded at 280° C. Separately, polypropylene (Tm: 168° C., melt flow rate: 25) pellets containing 0.05% by weight of 3,5-dicarboxybenzene tetra-n-butyl phosphonium sulfonate were used as a polyolefin material, and the pellets were dried at 100° C. for 2 hours, supplied to another extruder and melt extruded at 280° C. like the polyethylene terephthalate. These molten polymers were joined together in a dies to form a three-layered structure consisting of polyethylene terephthalate, polypropylene and polyethylene terephthalate, discharged from the dies, and wound around a cooling drum maintained at 20° C. under application of an electrostatic charge, to be cooled to solidify so as to prepare an unoriented multi-layered film comprising three layers The electrostatic charge application voltage was 5 kV and a current value running during the application was 0.2 mA, and the thus obtained film was a good film having an uniform thickness and free from displacement between layers and peeling between layers. Both the outer polyethylene terephthalate layers had a thickness of 20 μm and the inner polypropylene layer had a thickness of 150 μm.

When each layer constituting the unoriented multi-layered film was sampled and measured for its volume electric resistance in a molten state at 270° C. at an AC voltage of 50 Hz, it was found that the inner polypropylene layer had a volume resistance of $0.1 \times 10^9$ Ω.cm and the outer polyethylene terephthalate layers $0.1 \times 10^9$ Ω.cm.

The above unoriented multi-layered film was contacted with a heated roll to heat it at 100° C., drawn to 3.6 times in a longitudinal direction, and immediately cooled to 20° C. Thereafter, the film was drawn to 3.9 times in a transverse direction at 100° C. using a tenter type transverse stretching apparatus The film was then subjected to a heat treatment at 210° C., cooled to room temperature and rolled up. Heating, drawing, heat treatment and cooling steps were stable, and the thus obtained biaxially oriented multi-layered film consisting of three layers was excellent with small nonuniformity in each layer.

In the thus obtained biaxially oriented multi-layered film, the thickness of the outer polyethylene terephthalate layers was 1.4 μm, the thickness of the inner polypropylene layer was 11 μm and adhesion between the polyethylene terephthalate layer and the polypropylene layer was 0.8 g/cm.

This biaxially oriented multi-layered film was placed in a vacuum evaporator to vapor deposit 0.08 μm-thick aluminum on the surfaces of the polyethylene terephthalate layers at a vacuum degree of 10 to 5 mmHg and a deposition rate of 30 m/minute. When the polyethylene terephthalate layers having aluminum deposited thereon were peeled from the multi-layered film, the films were free from wrinkles and were not torn or broken at the time of peeling. As a result, very clean, extremely thin, vapor deposited polyethylene terephthalate films were obtained. Adhesion between the polyethylene terephthalate layer and the polypropylene layer was 0.6 g/cm.

This vapor deposited multi-layered film was slitted into a 1 cm-wide strip which was then rolled in such a manner that the aluminum surface faces out while the aluminum-deposited polyethylene terephthalate layers were peeled from the deposited multi-layered film and coated with metallicon to prepare a capacitor element. The thus obtained capacitor had a tanδ of 0.0037 (in an atmosphere of 23° C. and 60% RH) and exhibited excellent properties.

EXAMPLE 2

An unoriented multi-layered film comprising three layers, that is, polyethylene terephthalate, polypropylene and polyethylene terephthalate layers, was obtained in the same manner as in Example 1 except that polyethylene terephthalate (Tm: 256° C., Tg: 68° C.) containing 0.3% by weight of $SiO_2$ particles having an average particle diameter of 0.12 μm based on a polyester, copolymerized with 2 mmol % of 3,5-dicarboxybenzene tetra-n-butyl phosphonium sulfonate based on dicarboxylic acid components, and having an intrinsic viscosity of 0.60 was used as a polyester. A current value running during casting was 0.4 mA. This unoriented multi-layered film was extremely good without peeling between layers and displacement between layers. Both the outer polyethylene terephthalate layers had a thickness of 7 μm and the inner polypropylene layer had a thickness of 150 μm.

When each layer constituting this unoriented multi-layered film was sampled and measured for its volume electric resistance in a molten state at 270° C. at an AC voltage of 50 Hz, it was found that the inner polypropylene layer had an volume electric resistance of $0.1 \times 10^9$ Ω.cm and the outer polyethylene terephthalate layers $0.04 \times 10^9$ Ω.cm.

A biaxially oriented multi-layered film was obtained by subjecting the thus obtained unoriented multi-layered film to the same heating, drawing, heat treatment and cooling operations as in Example 1. Heating, drawing, heat treatment and cooling steps were extremely stable and the thus obtained biaxially oriented multi-layered film consisting of three layers was good with small nonuniformity in each layer. In this biaxially oriented multi-layered film, the outer polyethylene terephthalate layers had a thickness of 0.5 μm, the inner polypropylene layer had a thickness of 11 μm, and adhesion between the polyethylene terephthalate layer and the polypropylene layer was 0.9 g/cm.

COMPARATIVE EXAMPLE 1

An unoriented multi-layered film and a biaxially oriented multi-layered film therefrom, each comprising three layers, were obtained in the same manner as in Example 1 except that polypropylene (Tm: 160° C., melt flow rate: 25) pellets containing no 3,5-dicarboxybenzene tetra-n-butyl phosphonium sulfonate were used as a polyolefin material. A current value running during casting was 0.01 mA, the resulting unoriented multi-layered film was locally nonuniform and was frequently broken in a transverse drawing step, and the resulting biaxially oriented multi-layered film had extremely large nonuniformity.

When each layer constituting this multi-layered film was sampled and measured for its volume electric resistance in a molten state at 270° C. and at an AC voltage of 50 Hz, it was found that the inner polypropylene layer had a volume electric resistance of $1.5 \times 10^9$ Ω.cm and the outer polyethylene terephthalate layers $0.1 \times 10^9$ Ω.cm.

COMPARATIVE EXAMPLE 2

An unoriented multi-layered film and a biaxially oriented multi-layered film therefrom, each comprising three layers, were obtained in the same manner as in Example 1 except that polyethylene terephthalate (Tm: 250° C., Tg: 68° C.) copolymerized with 2 mmol of 3,5-dicarboxybenzene tetra-n-butyl phosphonium sulfonate was used as a polyester. A current value running during casting was 0.03 mA, the resulting unoriented multi-layered film was locally nonuniform and was frequently broken in a transverse drawing step, and the resulting biaxially oriented multi-layered film had extremely large nonuniformity in thickness.

When each layer constituting this multi-layered film was sampled and measured for its volume electric resistance in a molten state at 270° C. at an AC voltage of 50 Hz, it was found that the inner polypropylene layer had a volume electric resistance of $1.5 \times 10^9$ Ω.cm and the outer polyethylene terephthalate layers $0.04 \times 10^9$ Ω.cm.

EXAMPLE 3

Polyethylene terephthalate pellets having an intrinsic viscosity of 0.60 and containing 12 mmol % of potassium acetate based on dicarboxylic acid components and 0.3% by weight of kaolin having an average particle diameter of 0.9 μm were used as a polyester material, and polypropylene (Tm: 168° C., melt flow rate: 7, ethylene random copolymer) pellets containing 0.05% by weight of 3,5-dicarboxybenzene tetra-n-butyl phosphonium sulfonate were used as a polyolefin material. An unoriented multi-layered film consisting of three layers, that is, polyethylene terephthalate, polypropylene and polyethylene terephthalate layers, was obtained by drying and melt co-extruding under the same conditions as in Example 1 and cooling to solidify and electrostatically adhering under the same conditions as in Example 1. Electrostatic adhesion at this point was good, and nonuniformity and surface defects were at negligible levels. Specific volume resistance was $0.1 \times 10^9$ Ω.cm for both the inner polypropylene layer and the outer polyethylene terephthalate layers.

The thus obtained unoriented multi-layered film was biaxially oriented under the same conditions as in Example 1. In the thus obtained biaxially oriented multi-layered film, the outer polyethylene terephthalate layers had a thickness of 5 μm, the inner polypropylene layer had a thickness of 6 μm, and adhesion between the polyethylene terephthalate layer and the polypropylene layer was 0.6 g/cm. No rupture occurred during 8-hour production of a biaxially oriented multi-layered film. When each layer was peeled off from this multi-layered film and rolled up, each roll was of good form. When surface defects were inspected, no defects caused by poor electrostatic adhesion were seen and hence, the resulting film could be practically used as a thermal transfer printer ribbon base.

EXAMPLE 4

Polyethylene terephthalate pellets having an intrinsic viscosity of 0.60 and containing 12 mmol % of potassium acetate based on dicarboxylic acid components and 0.3% by weight of kaolin having an average particle diameter of 0.9 μm were used as a polyester material, and polypropylene (Tm: 168° C., melt flow rate: 7, ethylene random copolymer) pellets containing 0.05% by weight of 3,5-dicarboxybenzene tetra-n-butyl phosphonium sulfonate were used as a polyolefin material. An unoriented multi-layered film comprising two layers, that is, polyethylene terephthalate and polypropylene layers, was obtained by drying and melt co-extruding under the same conditions as in Example 1 and cooling to solidify and electrostatically adhering under the same conditions as in Example 1. Electrostatic adhesion was good, and defects of nonuniformity in thickness and surface were at negligible levels. Specific volume resistance was $0.1 \times 10^9$ Ω.cm for both the polypropylene layer and the polyethylene terephthalate layer.

The thus obtained unoriented multi-layered film was biaxially oriented under the same conditions as in Example 1. In the thus obtained biaxially oriented multi-layered film, the outer polyethylene terephthalate layers had a thickness of 5 μm, the inner polypropylene layer had a thickness of 6 μm, and adhesion between the polyethylene terephthalate layer and the polypropylene layer was 0.6 g/cm. No rupture occurred during 8-hour production of a biaxially oriented multi-layered film. When each layer was peeled off from this multi-layered film and rolled up, each roll was of good form. When surface defects were inspected, no defects caused by poor electrostatic adhesion were seen and hence, the resulting film could be practically used as a thermal transfer printer ribbon base.

EXAMPLE 5

Polyethylene-2,6-naphthalene dicarboxylate (Tm: 263° C., Tg: 113° C.) pellets having an intrinsic viscosity of 0.60 and containing 3 mmol % of 3,5-dicarboxybenzene tetra-n-butyl phosphonium sulfonate based on dicarboxylic acid components, 0.3% of $SiO_2$ particles having an average particle diameter of 0.12 μm and 0.03% of calcium carbonate based on a polyester were used as a polyester material. The pellets were dried at 170° C. for 6 hours, supplied to an extruder and melt extruded at 300° C. Separately, polypropylene pellets containing 0.05% by weight of 3,5-dicarboxybenzene tetra-n-butyl phosphonium sulfonate similar to those of Examples 1 and 2 were used. These pellets were co-extruded in the same manner as in Examples 1 and 2 to prepare an unoriented multi-layered film comprising three layers, that is, a polyethylene-2,6-naphthalene dicarboxylate layer, a polypropylene layer and a polyethylene-2,6-naphthalene dicarboxylate layer. Electrostatic adhesion was good, and nonuniformity-in-thickness and surface defects were at negligible levels. Specific volume resistance was $0.1 \times 10^9$ Ω.cm for both the inner layer and the outer layers.

The thus obtained unoriented multi-layered film was heated at 130° C. with an infrared heater, drawn to 4.5 times in a longitudinal direction and immediately cooled to 20° C. Thereafter, the film was drawn to 5.0 times in a transverse direction at 150° C. with a tenter type transverse stretching apparatus, subjected to a heat treatment at 210° C., cooled to room temperature and rolled. The outer polyethylene-2,6-naphthalene dicarboxylate layers had a thickness of 5 μm, the inner polypropylene layer had a thickness of 6 μm, and adhesion between the polyethylene-2,6-naphthalene dicarboxylate layer and the polypropylene layer was 0.6 g/cm. No rupture occurred during 8-hour production of a biaxially oriented multi-layered film. When each layer was peeled off from this multi-layered film and rolled up, each roll was of good form. When surface defects were inspected, no defects caused by poor electrostatic adhesion were seen and hence, the resulting film could be practically used for a magnetic recording base film, particularly for QIC.

EXAMPLE 6

Polyethylene-2,6-naphthalene dicarboxylate (Tm: 263° C., Tg: 113° C.) pellets having an intrinsic viscosity of 0.60 and containing 3 mmol % of 3,5-dicarboxybenzene tetra-n-butyl phosphonium sulfonate based on a dicarboxylic acid, 0.3% of $SiO_2$ particles having an average particle diameter of 0.12 $\mu$m and 0.03% of calcium carbonate based on a polyester were used as a polyester material. The pellets were dried at 170° C. for 6 hours, supplied to an extruder and melt extruded at 300° C. separately, polypropylene pellets containing 0.05% by weight of 3,5-dicarboxybenzene tetra-n-butyl phosphonium sulfonate similar to those of Examples 1 and 2 were used. These pellets were co-extruded in the same manner as in Examples 1 and 2 to prepare an unoriented multi-layered film comprising five layers, that is, a polyethylene-2,6-naphthalene dicarboxylate layer, a polypropylene layer, a polyethylene-2,6-naphthalene dicarboxylate layer, a polypropylene layer and a polyethylene-2,6-naphthalene dicarboxylate layer. Electrostatic adhesion was good, and defects of nonuniformity in thickness and surface were at negligible levels. Specific volume resistance was $0.1\times10^9$ $\Omega$.cm for both the polypropylene layers and the polyethylene-2,6-naphthalene dicarboxylate layers.

The thus obtained unoriented multi-layered film was heated at 130° C. with an infrared heater, drawn to 4.5 times in a longitudinal direction and immediately cooled to 20° C. Thereafter, the film was drawn to 5.0 times in a transverse direction at 150° C. with a tenter type transverse stretching apparatus, subjected to a heat treatment at 210° C., cooled to room temperature and rolled up. The outermost and inner polyethylene-2,6-naphthalene dicarboxylate layers had a thickness of 5 $\mu$m, the inner polypropylene layers had a thickness of 5 $\mu$m, and adhesion between the polyethylene-2,6-naphthalene dicarboxylate layer and the polypropylene layer was 0.6 g/cm at each layer interface. No rupture occurred during 8-hour production of a biaxially oriented multi-layered film. When each layer was peeled off and separated from this multi-layered film and rolled up, each roll was of good form. When surface defects were inspected, no defects caused by poor electrostatic adhesion were seen and hence, the resulting film could be practically used for a magnetic recording base film, particularly for QIC.

EXAMPLE 7

PPS (melting point: 285° C., containing 0.03% by weight of silica fine particles having an average particle diameter of 0.7 $\mu$m) pellets formed from sodium sulfide and 1,4-dichlorobenzene and having a melt viscosity of 2,500 poise were used. The pellets were supplied to an extruder and melt extruded at 305° C. Polypropylene (Tm: 168 C, melt flow rate: 25) pellets containing 0.05% by weight of tetra-n-butyl phosphonium of 3,5-dicarboxybenzene sulfonate were used as a polyolefin material and the pellets were dried at 100° C. for 2 hours, supplied to another extruder and melt extruded at 305° C. like PPS. These molten polymers were joined together in a dies to form a three-layered structure consisting of PPS, polypropylene and PPS, discharged from the dies, and wound around a cooling drum maintained at 20° C. under application of an electrostatic charge to the polymers, to be cooled to solidify so as to prepare an unoriented multi-layered film comprising three layers.

The electrostatic charge application voltage was 5 kV, a current value running during the application was 0.2 mA, and the thus obtained film was a good film having an uniform thickness and free from displacement between layers and peeling between layers. The outer PPS layers had a thickness of 20 $\mu$m and the inner polypropylene layer had a thickness of 150 $\mu$m.

When each layer constituting this unoriented multi-layered film was sampled and measured for its specific volume resistance in a molten state at 300° C. at an AC voltage of 50 Hz, it was found that the inner polypropylene layer had a specific volume resistance of $0.1\times10^9$ $\Omega$.cm and the outer PPS layers $0.1\times10^9$ $\Omega$.cm.

The above unoriented multi-layered film was contacted with a heated roll to heat it at 100° C., drawn to 4.0 times in a longitudinal direction, and then to 3.5 times in a transverse direction at 100° C. using a tenter type transverse stretching apparatus. The film was then subjected to a heat treatment at 210° C., cooled to room temperature and rolled up. Heating, drawing, heat treatment and cooling steps were stable and the thus obtained biaxially oriented multi-layered film comprising three layers was good with small nonuniformity in thickness in each layer.

In the thus obtained biaxially oriented multi-layered film, the thickness of the PPS layers was 1.4 $\mu$m and the thickness of the inner polypropylene layer was 11 $\mu$m.

This biaxially oriented multi-layered film was placed in a vacuum evaporator to vapor deposit 0.08 $\mu$m thick aluminum on the surfaces of the PPS layers at a vacuum degree of 10 to 5 mmHg and a deposition rate of 30 m/minute. When the PPS layers having aluminum-deposited thereon were peeled off from the multi-layered film, the films were free from wrinkles and were not torn or broken at the time of peeling. As the result, very clean, extremely thin, vapor deposition PPS films were obtained. Adhesion between the PPS layer and the polypropylene layer was 0.5 g/cm.

This vapor deposition multi-layered film was slitted into a 1 cm-wide strip which was rolled in such a manner that the aluminum surface faces out while the deposited PPS layers were peeled off from the deposited multi-layered film and coated with metallicon to prepare a capacitor element. At this point, no wrinkles, slacks and pinholes were produced in this production process and the thus obtained capacitor exhibited excellent properties.

We claim:

1. A multi-layered film which comprises:

(A) at least one first polymer layer of a polyolefin containing 0.001 to 1% by weight, based on the polyolefin, of a quaternary phosphonium salt of sulfonic acid and (B) at least one second polymer layer of a polymer selected from the group consisting of polyesters and polyphenylene sulfides, at least one first polymer layer and at least one second polymer layer being adjacent to each other and adhesion between the adjacent layers being in the range of 0.1 to 20 g/cm;

wherein the specific volume resistance of the first polymer layer in a molten state is $0.5\times10^9$ $\Omega$.cm or less at a temperature 15° C. higher than the melting point of the polymer constituting the second polymer layer.

2. The multi-layered film of claim 1, wherein the polyolefin constituting the first polymer layer is a homopolymer or copolymer of an $\alpha$-olefin having 2 to 10 carbon atoms.

3. The multi-layered film of claim 2, wherein the polyolefin is selected from the group consisting of low-density polyethylenes, high-density polyethylenes, propylene, poly(ethylene/propylene) copolymers and polybutylenes.

4. The multi-layered film of claim 1, wherein the quaternary phosphonium salt of sulfonic acid contained in the first polymer layer is at least one member selected from the group consisting of compounds represented by the following formula (I):

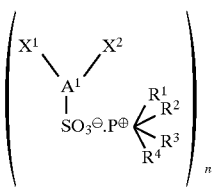

wherein $X^1$ and $X^2$ are the same or different and each is hydrogen atom or an ester-forming functional group; $R^1$, $R^2$, $R^3$ and $R^4$ are the same or different and each is an alkyl group having 1 to 18 carbon atoms, a benzyl group or an aryl group having 6 to 12 carbon atoms; n is 1 or 2; and $A^1$ is an aliphatic hydrocarbon group or an aromatic hydrocarbon group having 2 to 18 carbon atoms and a valence of (n+2), provided that both the $X^1$ and $X^2$ should not be hydrogen atom at the same time, and compounds represented by the following formula (II):

wherein $R^5$, $R^6$, $R^7$ and $R^8$ are the same or different and each is an alkyl group having 1 to 18 carbon atoms, a benzyl group or an aryl group having 6 to 12 carbon atoms; m is 1 or 2; and $A^2$ is an aliphatic hydrocarbon group or an aromatic hydrocarbon group having 4 to 18 carbon atoms and a valence of m.

5. The multi-layered film of claim 1 which contains the quaternary phosphonium salt of sulfonic acid in an amount of 0.003 to 0.5% by weight based on the polyolefin.

6. The multi-layered film of claim 1, wherein the polyester constituting the second polymer layer is an aromatic polyester comprising an aromatic dicarboxylic acid component and an aliphatic diol component having 2 to 10 carbon atoms.

7. The multi-layered film of claim 1, wherein the polyphenylene sulfide constituting the second polymer layer is poly(p-phenylene sulfide).

8. The multi-layered film of claim 1 which comprises at least one first polymer layer and at least one second polymer layer, both of which are adjacent to each other in the order named.

9. The multi-layered film of claim 1 which comprises three layers, that is, one first polymer layer and two second polymer layers, said first polymer layer having a first side and a second side, one of said second polymer layers being adjacent said first side of said first polymer layer and the other of said second polymer layers being adjacent to the second side of said first polymer layer.

10. The multi-layered film of claim 9, wherein each of the second polymer layers consists of at least two layers.

11. The multi-layered film of claim 1, wherein adhesion between the adjacent first polymer layer and second polymer layer is in the range of 0.1 to 10 g/cm.

12. The multi-layered film of claim 1, wherein the specific volume resistance of the second polymer layer in a molten state is $0.5 \times 10^9$ $\Omega$.cm or less at a temperature 15° C. higher than the melting point of the polymer constituting the second polymer layer.

13. The multi-layered film of claim 1 which is oriented at least monoaxially.

14. A film consisting of a first polymer layer obtained by peeling a first polymer layer off from the multi-layered film of claim 1.

15. A film consisting of a second polymer layer obtained by peeling a second polymer layer off from the multi-layered film of claim 1.

* * * * *